(12) United States Patent
Kincaid et al.

(10) Patent No.: US 9,902,262 B2
(45) Date of Patent: Feb. 27, 2018

(54) POWER TAKE-OFF UNIT WITH LOCKING DIFFERENTIAL

(71) Applicant: American Axle & Manufacturing, Inc., Detroit, MI (US)

(72) Inventors: Jeffrey L. Kincaid, Clarkston, MI (US); Robert C. Gorski, Clarkston, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 190 days.

(21) Appl. No.: 14/946,074

(22) Filed: Nov. 19, 2015

(65) Prior Publication Data
US 2017/0144539 A1    May 25, 2017

(51) Int. Cl.
| | | |
|---|---|---|
| B60K 17/348 | (2006.01) | |
| F16H 48/30 | (2012.01) | |
| F16H 48/08 | (2006.01) | |
| B60K 23/08 | (2006.01) | |

(52) U.S. Cl.
CPC .......... *B60K 17/348* (2013.01); *B60K 17/352* (2013.01); *B60K 23/08* (2013.01); *F16H 48/08* (2013.01); *B60K 2023/0833* (2013.01); *B60K 2023/0858* (2013.01); *B60Y 2400/422* (2013.01); *F16H 2048/087* (2013.01)

(58) Field of Classification Search
None
See application file for complete search history.

(56) References Cited

U.S. PATENT DOCUMENTS

| | | | |
|---|---|---|---|
| 2,228,581 A | | 1/1941 | Olen |
| 5,411,447 A | * | 5/1995 | Frost .................. B60K 17/3467 475/223 |
| 5,620,072 A | * | 4/1997 | Engle .................. B60K 17/342 180/247 |
| 6,851,501 B2 | | 2/2005 | Gassmann |
| 7,150,694 B2 | | 12/2006 | Mizon et al. |
| 8,469,854 B1 | * | 6/2013 | Downs .................. B60K 23/08 475/221 |
| 2006/0065067 A1 | * | 3/2006 | Swanson ................ F16H 63/30 74/335 |
| 2010/0044138 A1 | * | 2/2010 | Marsh .................. B60K 17/348 180/247 |

(Continued)

*Primary Examiner* — Justin Holmes
(74) *Attorney, Agent, or Firm* — Harness, Dickey & Pierce, P.L.C.

(57) ABSTRACT

An all-wheel drive vehicle driveline can include an input member, first intermediate member, output member, sleeve, ring gear, and pinion gear. The input member can be coupled to an input of a differential mechanism for common rotation. The output member can be coupled to an output of the differential mechanism for common rotation. The sleeve can be axially movable between a first position wherein the input, output, and first intermediate members are rotatable relative to each other, a second position wherein the sleeve couples the input member to the first intermediate member for common rotation, and a third position wherein the sleeve couples the input member to the output member for common rotation. The ring gear can receive rotary power from the first intermediate member. The pinion gear can be meshingly engaged to the ring gear.

20 Claims, 6 Drawing Sheets

(56) References Cited

U.S. PATENT DOCUMENTS

| | | | |
|---|---|---|---|
| 2012/0238394 A1* | 9/2012 | Valente | B60K 17/346 475/221 |
| 2013/0303324 A1* | 11/2013 | Valente | F16H 37/082 475/204 |
| 2013/0303326 A1* | 11/2013 | Downs | F16H 48/22 475/221 |
| 2014/0309074 A1* | 10/2014 | Janson | B60K 23/08 475/225 |

* cited by examiner

POWER TAKE-OFF UNIT WITH LOCKING DIFFERENTIAL

FIELD

The present disclosure relates to power take-off units with a locking differential.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction. Such AWD vehicles are typically equipped with a much more complex drivetrain (relative to a FWD architecture) which, in addition to the primary driveline, must include the additional components associated with the secondary driveline such as a power take-off unit and a propshaft.

The primary driveline typically includes a differential unit to provide differential torque to a pair of primary drive wheels (i.e., left and right front wheels). In certain driving conditions, it can be beneficial to provide equal torque to both primary drive wheels. Locking differentials configured to lock the differential unit to provide equal torque to each of the primary drive wheels are generally known in the art. Such locking differentials typically incorporate a differential locking system including an actuator and additional locking parts to lock the differential unit for equal output.

Additionally, in an effort to minimize driveline losses associated with rotating components in the secondary driveline, which are either driven by the primary driveline or back-driven by the vehicle wheels, it is generally known to incorporate a separate disconnect system in a power take-off unit that is configured to uncouple components of the secondary driveline such as, for example, the rear wheels or the rear differential from the remainder of the secondary driveline. To this end, there remains a need in the art for development of improved driveline components for use in the disconnectable drivelines of AWD vehicles.

SUMMARY

This section provides a general summary of the disclosure, and is not a comprehensive disclosure of its full scope or all of its features.

The present teachings provide for an all-wheel drive vehicle driveline including an input member, a first intermediate member, an output member, a sleeve, a bevel ring gear, and a bevel pinion gear. The input member can be disposed about a first axis. The input member can be adapted to be coupled to an input of a differential mechanism for common rotation about the first axis. The first intermediate member can be disposed about the first axis. The output member can be disposed about the first axis. The output member can be adapted to be coupled to an output of the differential mechanism for common rotation about the first axis. The sleeve can be disposed about the first axis. The sleeve can be movable along the first axis between a first position wherein the input, output, and first intermediate members can be rotatable relative to each other, a second position wherein the sleeve can couple the input member to the first intermediate member for common rotation about the first axis, and a third position wherein the sleeve can couple the input member to the output member for common rotation about the first axis. The bevel ring gear can be drivingly coupled to the first intermediate member to receive rotary power therefrom. The bevel pinion gear can be meshingly engaged to the bevel ring gear and rotatable about a second axis that is not parallel to the first axis.

The present teachings further provide for an all-wheel drive vehicle driveline including an input member, a first intermediate member, an output member, a clutch member, a bevel ring gear, and a bevel pinion gear. The input member can be disposed about a first axis. The input member can be adapted to be coupled to an input of a differential mechanism for common rotation about the first axis. The first intermediate member can be disposed about the first axis. The output member can be disposed about the first axis. The output member can be adapted to be coupled to an output of the differential mechanism for common rotation about the first axis. The clutch member can be movable along the first axis between a first position wherein the input, output, and first intermediate members can be rotatable relative to each other, a second position wherein the clutch member can couple the input member to the first intermediate member for common rotation about the first axis, and a third position wherein the clutch member can couple the input member to the output member and the first intermediate member for common rotation about the first axis. The bevel ring gear can be drivingly coupled to the first intermediate member to receive rotary power therefrom. The bevel pinion gear can be meshingly engaged to the bevel ring gear and rotatable about a second axis that is not parallel to the first axis.

The present teachings further provide for an all-wheel drive vehicle driveline including a differential mechanism, a first axle shaft and a second axle shaft, an input member, a first intermediate member, a locking member, a clutch member, a bevel ring gear, and a bevel pinion gear. The differential mechanism can include a differential case, a differential gearset, and a pair of differential outputs. The differential case can be adapted to receive input torque and rotate about a first axis. The differential gearset can be coupled to the differential case and can be configured to output differential torque to the differential outputs. The first axle shaft and a second axle shaft can be coupled to a respective one of the differential outputs for common rotation about the first axis. The input member can be disposed about the first axle shaft. The input member can be coupled to the differential case for common rotation about the first axis. The first intermediate member can be disposed about the first axle shaft. The locking member can be disposed about the first axle shaft and can be coupled to the first axle shaft for common rotation about the first axis. The clutch member can be movable along the first axis between a first position wherein the input member, locking member, and first intermediate member can be rotatable relative to each other, a second position wherein the clutch member can couple the input member to the first intermediate member for common rotation about the first axis, and a third position wherein the clutch member can couple the input member to the locking member and the first intermediate member for common rotation about the first axis. The bevel ring gear can be drivingly coupled to the first intermediate member. The bevel pinion gear can be meshingly engaged to the bevel ring gear and can be rotatable about a second axis that is not parallel to the first axis.

3

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
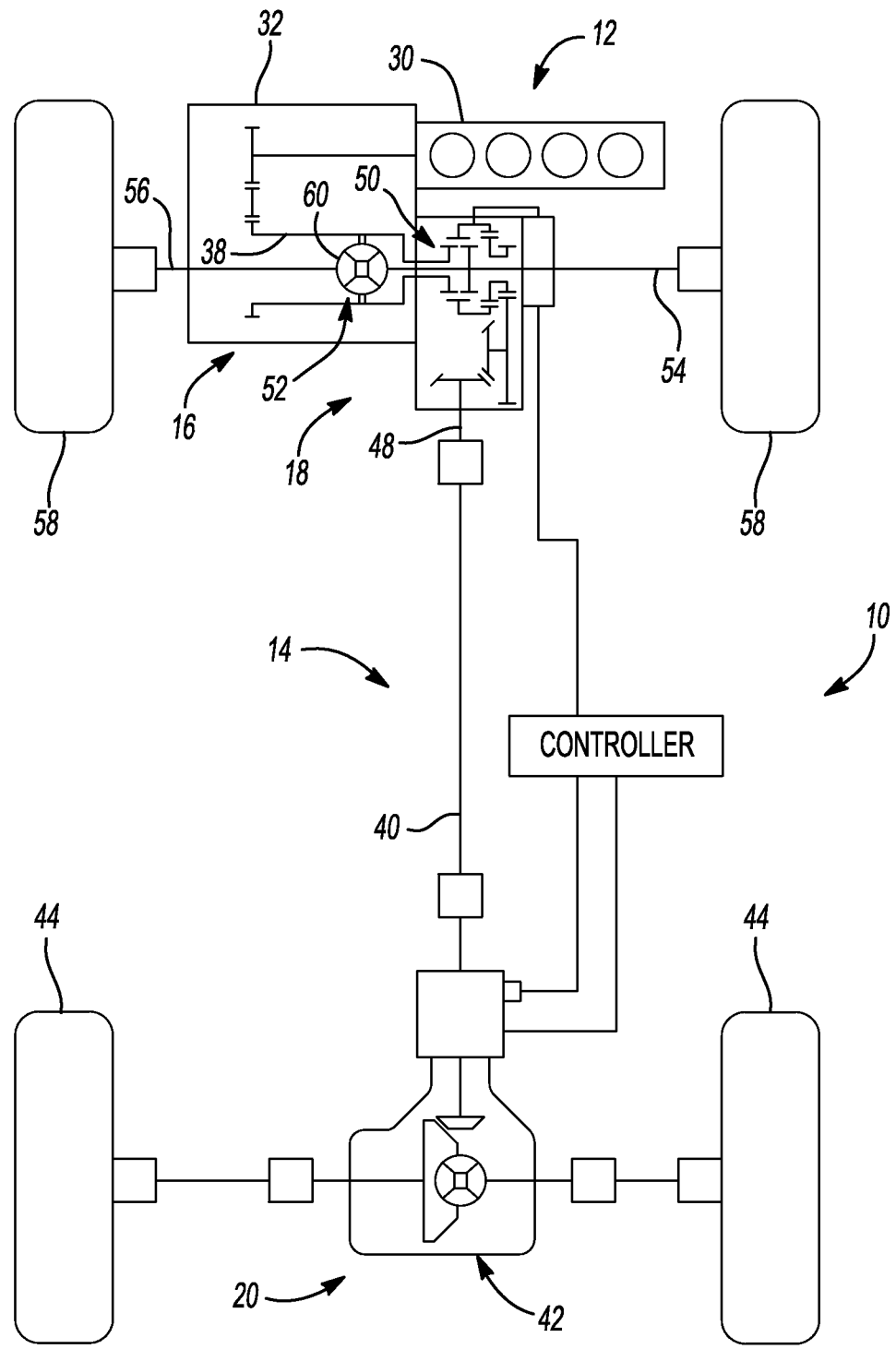
FIG. 1 is a schematic illustration of a vehicle having a disconnecting AWD driveline including a power take-off unit constructed in accordance with the teachings of the present disclosure.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which outputs rotary power to the primary driveline 16 and the PTU 18 via an output 38 of the transmission 32. The PTU 18 can be selectively operated to transmit rotary power to the secondary driveline 20. In the particular example provided, the secondary driveline 20 includes a propshaft 40 and a rear axle assembly 42 that is configured to receive rotary power from the propshaft 40 and to responsively drive a set of vehicle wheels 44. In the example provided, the PTU 18 includes a PTU output member 48 that is coupled to the propshaft 40 for common rotation about a longitudinal axis of the vehicle 10. As will be discussed in more detail below, the PTU 18 includes a disconnect mechanism 50 to selectively control power transmission through the PTU 18 to thereby selectively drive the propshaft 40.

The primary driveline 16 can include a first differential 52 and a pair of axle half-shafts (first half-shaft 54 and second half-shaft 56) that can couple an output of the first differential 52 to another set of vehicle wheels 58. Except as noted herein, the first differential 52 can be conventional in its construction and operation and as such, need not be discussed in significant detail herein. Briefly, the first differential 52 can include a differential case 60, which can be driven

4 by the transmission 32, and a means for transmitting rotary power between the differential case 60 and the first and second half-shafts 54, 56. In the example provided, the rotary power transmitting means is an open differential gearset that permits speed and torque differentiation between the first and second half-shafts 54, 56.

Figure 2:
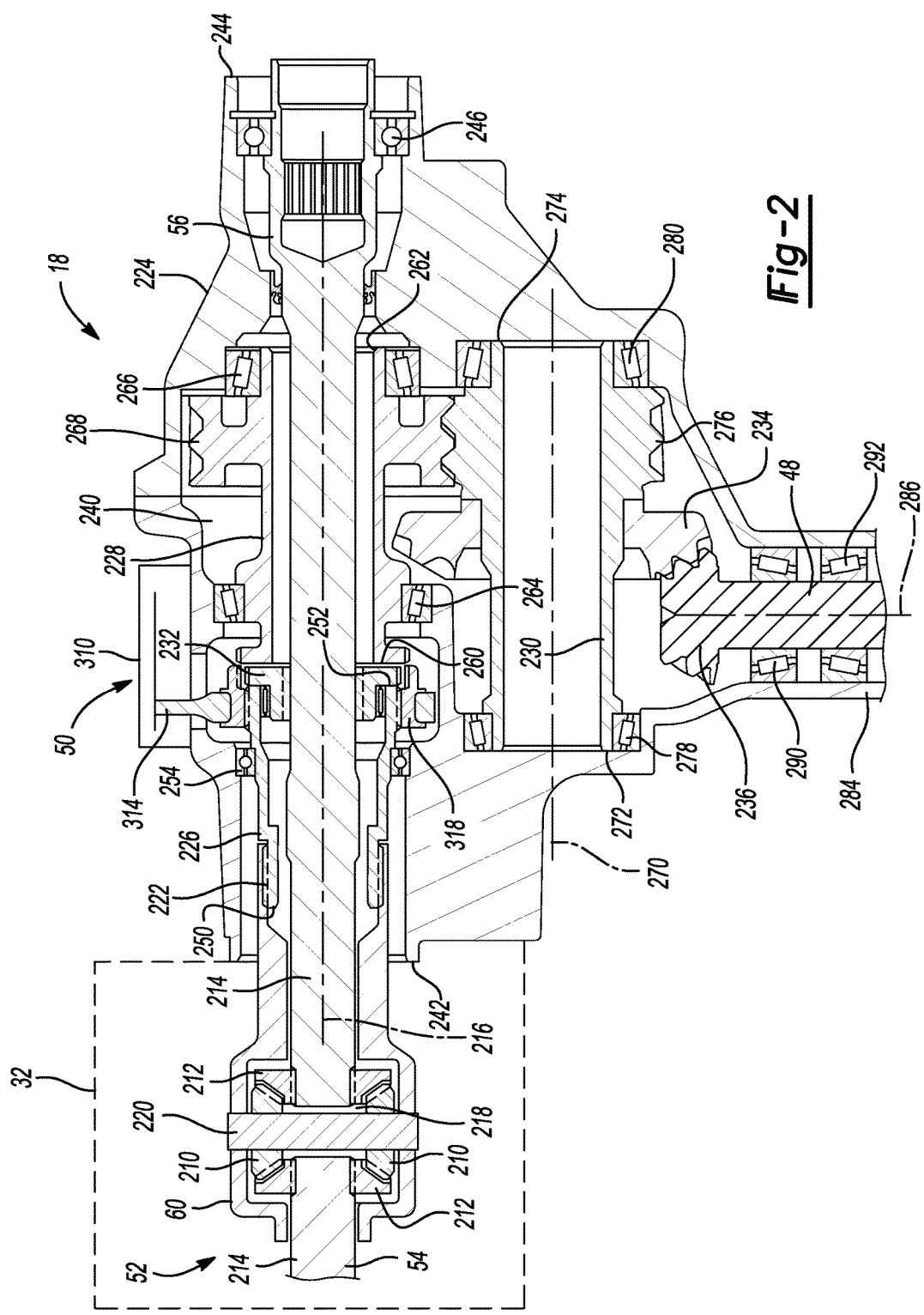
FIG. 2 is a sectional view of a portion of the AWD driveline including a portion of the power take-off unit that is schematically illustrated in FIG. 1.

With additional reference to FIG. 2, the PTU 18 and first differential 52 are illustrated in more detail. In the example provided, the first differential 52 can include the differential case 60, a pair of pinion gears 210, a pair of side gears 212, and a pair of differential outputs 214. The differential case 60 can be driven by the output 38 (FIG. 1) of the transmission 32 (FIG. 1) to rotate about a first axis 216. The differential case 60 can define a differential cavity 218 and the pinion gears 210 can be disposed within the differential cavity 218.

The pinion gears 210 can be coupled to the differential case 60 for common rotation about the first axis 216 and for relative rotation about a differential axis that is transverse to the first axis 216. In the example provided, the pinion gears 210 are rotatably mounted to a cross-pin 220 that is transverse to the first axis 216 and coupled to the differential case 60 for common rotation about the first axis 216.

The side gears 212 can be disposed in the differential cavity 218 and rotatable about the first axis 216 relative to the differential case 60. Each differential output 214 can be coupled to a respective one of the side gears 212 for common rotation about the first axis 216 with the respective side gear 212. The side gears 212 can be meshingly engaged with the pinion gears 210 to provide differential torque to the differential outputs 214 when the differential case 60 receives input torque from the transmission 32 (FIG. 1).

Each half-shaft 54, 56 can be disposed about the first axis 216. Each of the differential outputs 214 can be coupled to a respective one of the half-shafts 54, 56 for common rotation about the first axis 216. In the example provided, each of the differential outputs 214 are unitarily formed with the respective one of the half-shafts 54, 56, though other configurations can be used.

The PTU 18 can include a housing 224, a PTU input member 226, a first intermediate member 228, a second intermediate member 230, a locking member 232, the disconnect mechanism 50, a ring gear 234, the PTU output member 48, and a pinion gear 236.

The housing 224 can define a PTU cavity 240 and can be fixedly coupled to a rigid structure of the vehicle 10 (FIG. 1), such as a housing of the transmission 32 (FIG. 1) for example. The housing 224 can be formed of multiple shells or parts that are coupled together (e.g. bolted or welded) to define the PTU cavity 240. The first half-shaft 56 can extend along the first axis 216, through a first side 242 of the housing 224, through the PTU cavity 240, and through an opposite, second side 244 of the housing 224. In the example provided, the first half-shaft 56 is supported for rotation about the first axis 216 by a bearing 246 disposed radially between the housing 224 and the first half-shaft 56, proximate to the second side 244 of the housing 224.

The input member 226 can be a hollow, generally cylindrical member disposed within the PTU cavity 240 and disposed about the first half-shaft 56. The input member 226 can have a first end 250 and a second end 252. In the example provided, the input member 226 is supported within the PTU cavity 240 by a bearing 254 disposed radially between the housing 224 and the input member 226 and axially between the first and second ends 250, 252. The input member 226 can be rotatable relative to the housing 224 and rotatable relative to the first half-shaft 56. The input member 226 can be coupled to the differential case 60 for common rotation about the first axis 216. In the example provided, the first end 250 of the input member 226 is coupled to the differential case 60 via mating splines 222, though other configurations can be used.

The first intermediate member 228 can be a hollow, generally cylindrical member disposed within the PTU cavity 240 and disposed about the first half-shaft 56. The first intermediate member 228 can have a first end 260 proximate to the second end 252 of the input member 226, and a second end 262 that is distal to the input member 226. In the example provided, the first intermediate member 228 is supported within the PTU cavity 240 for rotation about the first axis 216 by a bearing 264 proximate to the first end 260 of the first intermediate member 228, and by a bearing 266 proximate to the second end 262 of the first intermediate member 228. The bearings 264, 266 can be disposed radially between the housing 224 and the first intermediate member 228. The first intermediate member 228 can include a first intermediate gear 268. In the example provided, the first intermediate gear 268 is located proximate to the second end 262 of the first intermediate member 228.

The second intermediate member 230 can be a generally cylindrical member disposed within the PTU cavity 240 and disposed about a second axis 270. The second axis 270 can be parallel to and offset from the first axis 216. The second intermediate member 230 can have a first end 272 and a second end 274, and in the example provided, is a hollow member disposed about the second axis 270. The second intermediate member 230 can include a second intermediate gear 276, and in the example provided, the second intermediate gear 276 is located proximate to the second end 274 of the second intermediate member 230. The second intermediate gear 276 can be meshingly engaged with the first intermediate gear 268 to transmit torque therebetween. In the example provided, the second intermediate member 230 is supported within the PTU cavity 240 by a bearing 278 proximate to the first end 272 of the second intermediate member 230 and a bearing 280 proximate to the second end 274 of the second intermediate member 230. The bearings 278, 280 can be disposed radially between the housing 224 and the second intermediate member 230.

The ring gear 234 can be a bevel ring gear. The ring gear 234 can be fixedly coupled (e.g. welded or bolted) to the second intermediate member 230 for common rotation about the second axis 270. In the example provided, the ring gear 234 is located axially between the first and second ends 272, 274 of the second intermediate member 230, and axially between the first and second ends 272, 274 of the first intermediate member 228, though other configurations can be used.

The PTU output member 48 can extend into the PTU cavity 240 from a third side 284 of the housing 224 and can be disposed about a third axis 286. The third axis 286 can be not parallel (e.g. transverse) to the first and second axes 216, 270, and in the example provided, the third axis 286 is perpendicular to the first and second axes 216, 270. As described above with reference to FIG. 1, The PTU output member 48 can be drivingly coupled to the propshaft 40 (FIG. 1) to transmit rotary power to the secondary driveline 20.

The pinion gear 236 can be coupled to the PTU output member 48 for common rotation about the third axis 286. The pinion gear 236 can be a bevel pinion gear meshingly engaged with the ring gear 234. In the example provided, the ring gear 234 and pinion gear 236 are hypoid bevel gears, though the teeth of the ring gear 234 and the pinion gear 236 can have any suitable geometry, such as straight bevel gears, or spiral bevel gears for example. In the example provided, the PTU output member 48 is supported for rotation about the third axis 286 by a head bearing 290 disposed radially between the housing 224 and the PTU output member 48 proximate to the pinion gear 236, and a tail bearing 292 disposed radially between the housing 224 and the PTU output member 48 distal to the pinion gear 236.

The locking member 232 can be a generally cylindrical member disposed within the PTU cavity 240 and disposed about the first axis 216. The locking member 232 can be at least partially disposed axially between the second end 252 of the input member 226 and the first end 260 of the first intermediate member 228 as described in greater detail below. The locking member 232 can be coupled to the first half-shaft 56 or the respective one of the differential outputs 214 for common rotation about the first axis 216.

Figure 3:
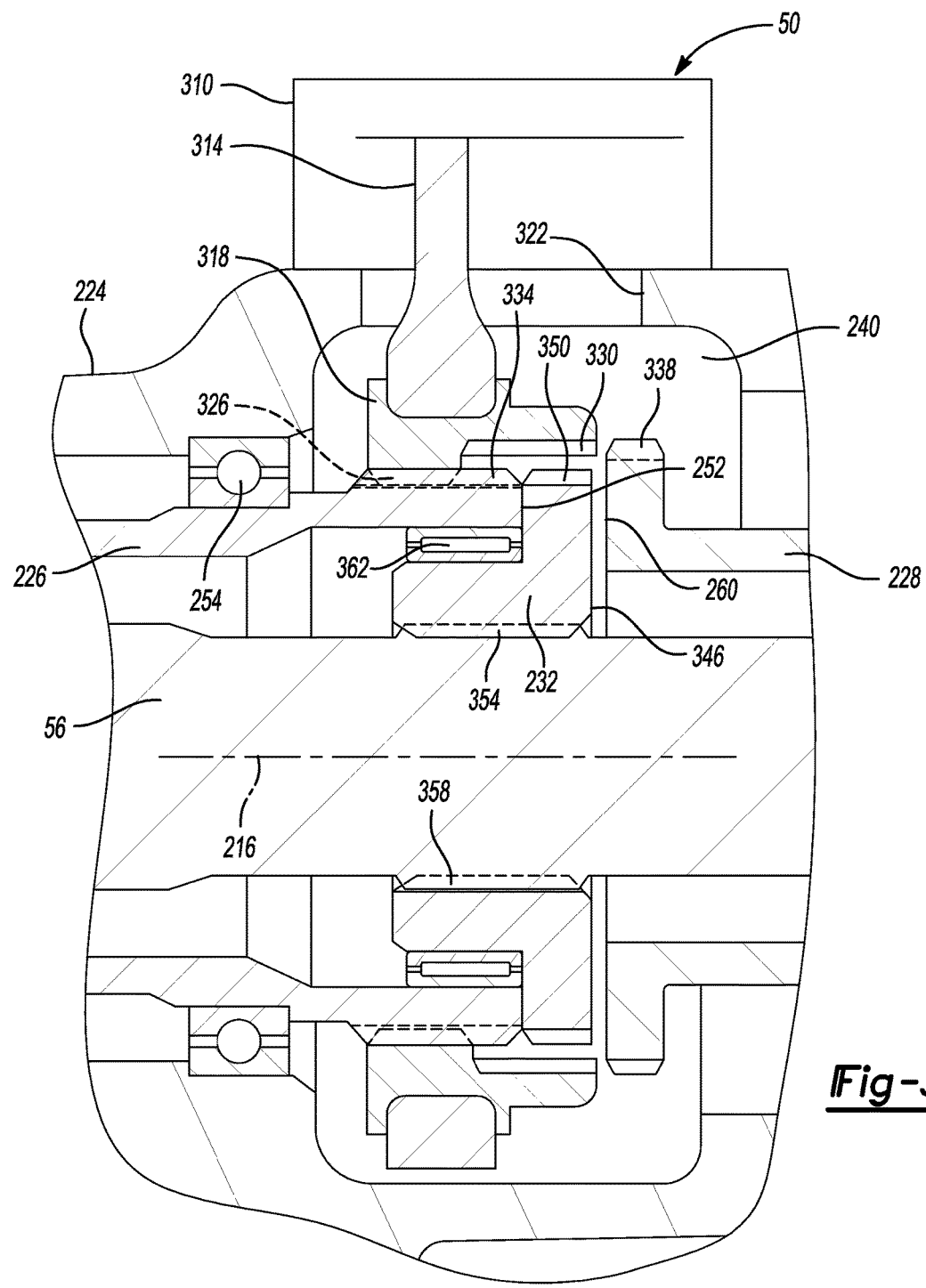
FIG. 3 is a sectional view of a portion of the power take-off unit shown in FIG. 2, illustrating a shift sleeve in a first position.

With additional reference to FIG. 3, the disconnect mechanism 50 can include an actuator 310, a shift fork 314, and a shift sleeve 318. The actuator 310 can be any suitable type of actuator (e.g. a solenoid, hydraulic ram, or screw-type actuator) configured to move the shift fork 314 generally in the axial direction relative to the first axis 216. The actuator 310 can be mounted to the housing 224 and in the example provided, is mounted to an exterior of the housing 224, though other configurations can be used. The shift fork 314 can be at least partially disposed within the PTU cavity 240, and in the example provided, extends through an aperture 322 in the housing 224 and into the PTU cavity 240. While not specifically shown, the disconnect mechanism 50 can also include one or more sensors configured to determine the position of the shift fork 314 or the shift sleeve 318.

The shift sleeve 318 can be a generally cylindrical member disposed about the first axis 216. The shift sleeve 318 can be coupled to the shift fork 314 for common translation in the axial direction of the first axis 216 (i.e. along the first axis 216). The shift sleeve 318 can define a first set of internal teeth or splines 326 and a second set of internal teeth or splines 330. In the example provided, the first set of internal splines 326 extend radially inward further than the second set of internal splines 330, such that the shift sleeve 318 can have an innermost diameter that is greater along the length of the second set of internal splines 330 than along the length of the first set of internal splines 326.

The input member 226 can define a first set of external teeth or splines 334 proximate to the second end 252 of the input member 226. The first set of external splines 334 can be configured to meshingly engage with the first set of internal splines 326. The first intermediate member 228 can define a second set of external teeth or splines 338 proximate to the first end 260 of the first intermediate member 228. In the example provided, the second set of external splines 338 are radially outward of the first set of external splines 334. The second set of external splines 338 can be configured to meshingly engage with the second set of internal splines 330.

The locking member 232 can include an inner portion 342 and an outer portion 346. The outer portion 346 can be radially outward of the inner portion 342 and can extend radially outward therefrom to be axially between the second end 252 of the input member 226 and the first end 260 of the first intermediate member 228. The outer portion 346 can define a third set of external teeth or splines 350 that are disposed axially between the first and second sets of external splines 334, 338. In the example provided, the third set of external splines 350 has an outermost diameter similar to the outermost diameter of the first set of external splines 334 and the first set of internal splines 326 such that the third set of external splines 350 can meshingly engage with the first set of internal splines 326.

The inner portion 342 of the locking member 232 can define a fourth set of internal teeth or splines 354 that can be meshingly engaged with a fourth set of external teeth or splines 358 that are defined by the first half-shaft 56 or the respective one of the differential outputs 214. In the example provided, the inner portion 342 extends axially toward the first side 242 of the housing 224, between the input member 226 and the first half-shaft 56. In the example provided, a bearing or a bushing 362 is disposed radially between the inner portion 342 and the input member 226.

Figure 4:
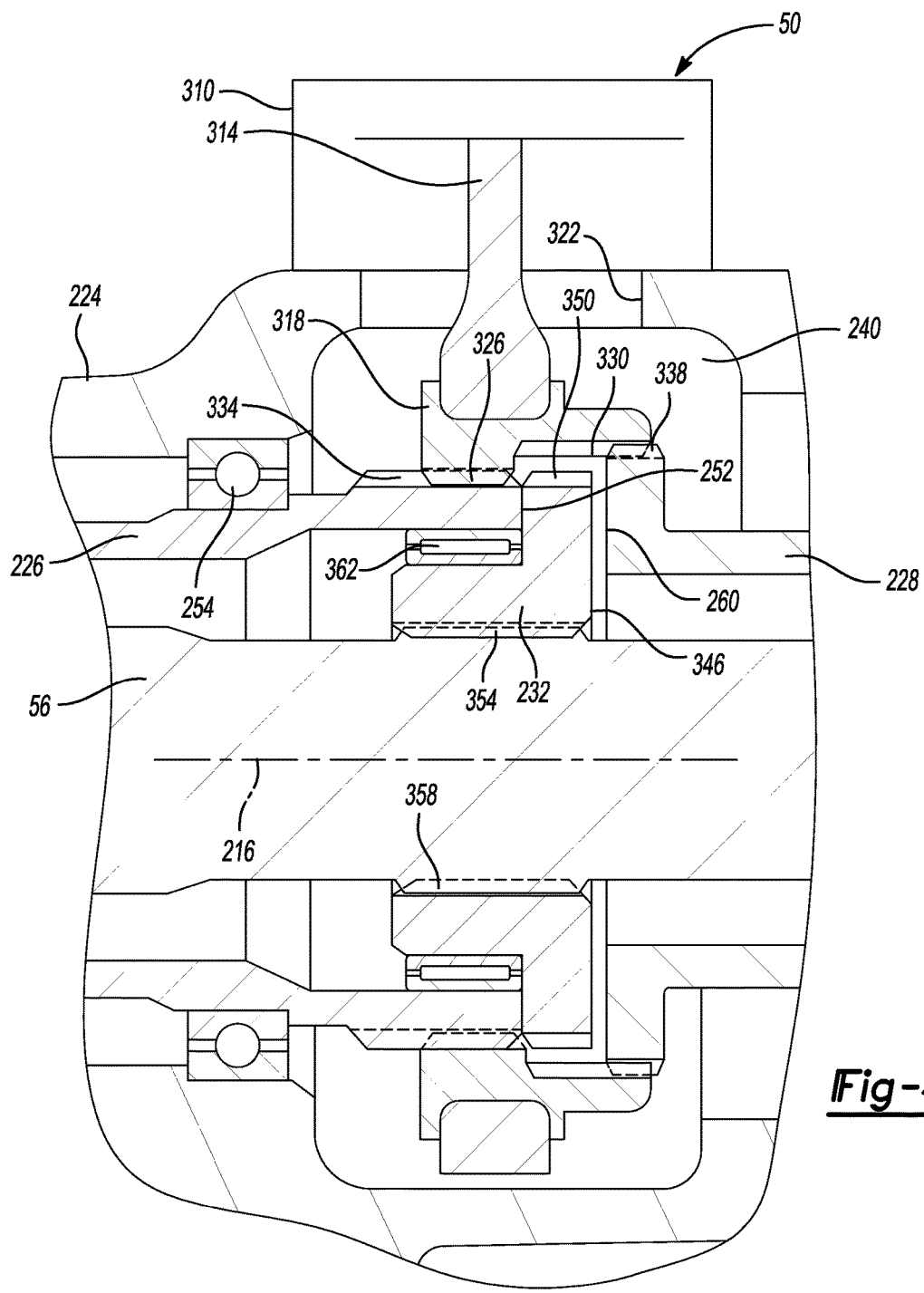
FIG. 4 is a sectional view similar to FIG. 3, illustrating the shift sleeve in a second position.
Figure 5:
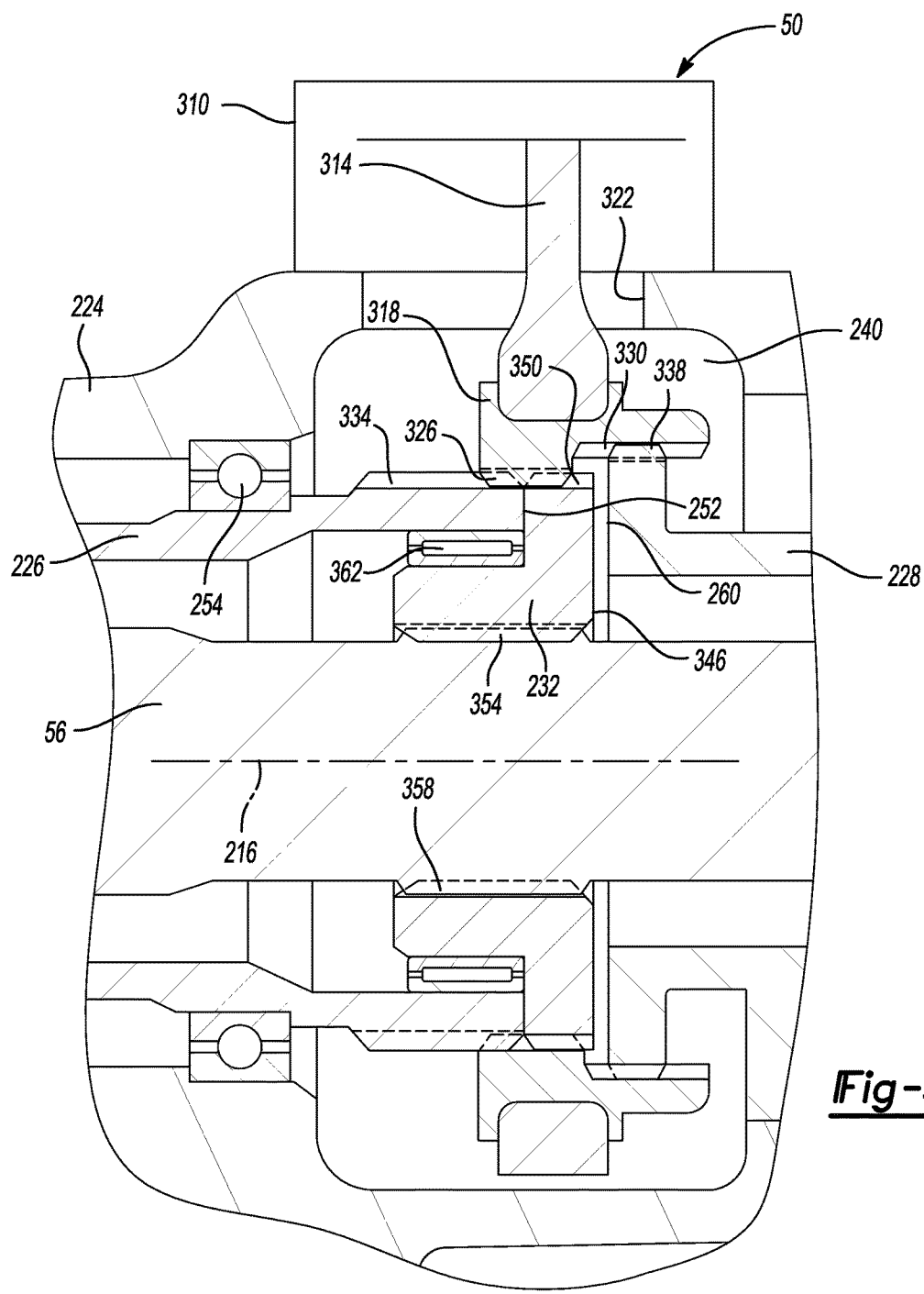
FIG. 5 is a sectional view similar to FIG. 3, illustrating the shift sleeve in a third position.

With reference to FIGS. 3, 4, and 5, the operation of the disconnect mechanism 50 is shown in greater detail. In general, the disconnect mechanism 50 can selectively lock the first differential 52 (FIGS. 1 and 2) and also selectively provide output torque to the secondary driveline 20 (FIG. 1) with a single actuator (i.e. the actuator 310). In operation, the actuator 310 can be selectively, or automatically operated to move the shift fork 314, and thus move the shift sleeve 318 between a first position (e.g. disconnected position) shown in FIG. 3, a second position (e.g. AWD) shown in FIG. 4, and a third position (e.g. locked AWD) shown in FIG. 5.

With specific reference to FIG. 3, when the shift sleeve 318 is in the first position, the input member 226, first intermediate member 228, and locking member 232 can rotate about the first axis 216 relative to each other. In the example provided, when the shift sleeve 318 is in the first position, the first set of internal splines 326 are meshingly engaged with the first set of external splines 334, but are not engaged with either of the second or third sets of external splines 338, 350. In the example provided, when the shift sleeve 318 is in the first position, the second set of internal splines 330 is not engaged with either of the first, second, or third sets of external splines 334, 338, 350. Thus, when the shift sleeve 318 is in the first position, power is transmitted from the transmission 32 (FIG. 1) to the differential case 60 (FIG. 2) of the first differential 52 (FIG. 2) and differential torque can be transmitted to the first and second half-shafts 54, 56, while torque is not transferred through the PTU 18 (FIGS. 1 and 2) to the secondary driveline 20 (FIG. 1).

With specific reference to FIG. 4, when transmission of power to the secondary driveline 20 (FIG. 1) is desired, the actuator 310 can move the shift fork 314 (and thus the shift sleeve 318) axially to position the shift sleeve 318 in the second position. When the shift sleeve 318 is in the second position, the shift sleeve 318 couples the input member 226 to the first intermediate member 228 for common rotation about the first axis 216. In the example provided, when the shift sleeve 318 is in the second position, the first set of internal splines 326 is engaged with the first set of external splines 334, and the second set of internal splines 330 is engaged with the second set of external splines 338. When the shift sleeve 318 is in the second position, neither of the first or second sets of internal splines 326, 330 are engaged with the third set of external splines 350. When the shift sleeve 318 is in the second position, rotary power is transmitted from the transmission 32 (FIG. 1) to the differential case 60 (FIG. 2), from the differential case 60 (FIG. 2) to the input member 226, from the input member 226 to the shift sleeve 318, from the shift sleeve 318 to the first intermediate member 228. Thus, when the shift sleeve 318 is in the second position, differential torque can be transmitted to the first and second half-shafts 54, 56, while torque is also transferred through the PTU 18 (FIGS. 1 and 2) to the secondary driveline 20 (FIG. 1).

With specific reference to FIG. 5, when equal power to the first and second half-shafts 54, 56 is desired, and power to the secondary driveline 20 (FIG. 1) is desired, the actuator 310 can move the shift fork 314 (and thus the shift sleeve 318) axially to position the shift sleeve 318 in the third position. When the shift sleeve 318 is in the third position, the shift sleeve 318 couples the input member 226 to the first intermediate member 228 and the locking member 232 for common rotation about the first axis 216. In the example provided, when the shift sleeve 318 is in the third position, the first set of internal splines 326 is engaged with the first set of external splines 334 and the third set of external splines 350, and the second set of internal splines 330 are engaged with the second set of external splines 338. When the shift sleeve 318 is in the third position, rotary power is transmitted from the transmission 32 (FIG. 1) to the differential case 60 (FIG. 2), from the differential case 60 (FIG. 2) to the input member 226, from the input member 226 to the shift sleeve 318, from the shift sleeve 318 to the first intermediate member 228. Additionally, the shift sleeve 318 couples the differential case 60 (FIG. 2) to the first half-shaft 56 for common rotation. Thus, when the shift sleeve 318 is in the third position, equal torque can be transmitted to the first and second half-shafts 54, 56, while torque is also transferred through the PTU 18 (FIGS. 1 and 2) to the secondary driveline 20 (FIG. 1).

Figure 6:
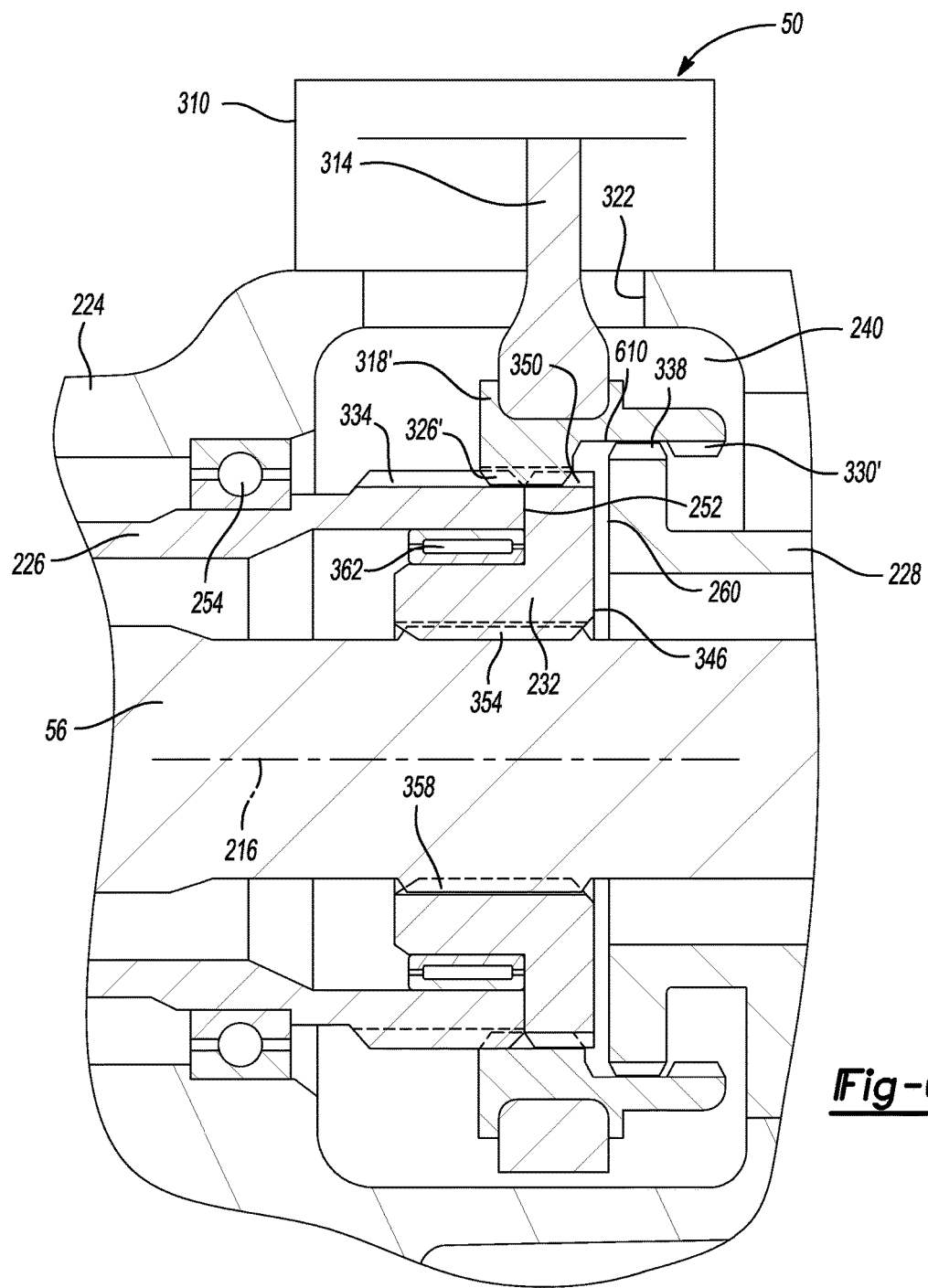
FIG. 6 is a sectional view similar to FIG. 3, illustrating a shift sleeve of an alternate construction in a fourth position.

With specific reference to FIG. 6, an alternative construction of the shift sleeve 318 is shown and indicated by reference numeral 318'. The shift sleeve 318' can be similar to the shift sleeve 318 except as otherwise shown or described herein. Elements of shift sleeve 318' that are similar to elements of the shift sleeve 318 are indicated by similar, but primed numbers. Accordingly, the descriptions of the similar elements are incorporated herein by reference. Specifically, the shift sleeve 318' can include a groove 610 between the first set of internal splines 326' and the second set of internal splines 330'. The groove 610 can extend circumferentially about the shift sleeve 318'. The groove 610 can have an axial length greater than the axial length of the second set of external splines 338 and can extend radially outward of the second set of external splines 338.

When equal power to the first and second half-shafts 54, 56 is desired, but power to the secondary driveline 20 (FIG. 1) is not desired, the actuator 310 can move the shift fork 314 (and thus the shift sleeve 318') axially to position the shift sleeve 318' in a fourth position, shown in FIG. 6. When the shift sleeve 318' is in the fourth position, the second set of external splines 338 can be received in the groove 610 such that the shift sleeve 318' is rotatable relative to the first intermediate member 228. When the shift sleeve 318' is in the fourth position, the shift sleeve 318' continues to couple the input member 226 to the locking member 232 for common rotation, via the first set of internal splines 326', the first set of external splines 334, and the third set of external splines 350.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An all-wheel drive vehicle driveline comprising:
    an input member disposed about a first axis and defining a first set of splines, the input member being adapted to be coupled to an input of a differential mechanism for common rotation about the first axis;
    a first intermediate member disposed about the first axis and defining a second set of splines;
    an output member disposed about the first axis and defining a third set of splines that are located axially between the first and second sets of splines, the output member being adapted to be coupled to an output of the differential mechanism for common rotation about the first axis;
    a sleeve disposed about the first axis and defining mating splines configured to matingly engage the first, second and third sets of splines, the sleeve being movable along the first axis between a first position wherein the input, output, and first intermediate members are rotatable relative to each other, a second position wherein the sleeve couples the input member to the first intermediate member for common rotation about the first axis, and a third position wherein the sleeve couples the input member to the output member for common rotation about the first axis;
    a bevel ring gear drivingly coupled to the first intermediate member to receive rotary power therefrom; and
    a bevel pinion gear meshingly engaged to the bevel ring gear and rotatable about a second axis that is not parallel to the first axis.

2. The vehicle driveline of claim 1, further comprising:
    a differential mechanism including a differential case, a differential gearset, and a pair of differential outputs, the differential case being adapted to receive input torque and being coupled to the input member for common rotation about the first axis, the differential gearset being received in the differential case and configured to output differential torque to the differential outputs, one of the differential outputs being coupled to the output member for common rotation about the first axis.

3. The vehicle driveline of claim 1, wherein the mating splines include a fourth set of splines and a fifth set of splines, the fourth set of splines being configured to matingly engage the first and third sets of splines, the fifth set of splines being configured to matingly engage the second set of splines.

4. The vehicle driveline of claim 3, wherein the fifth set of splines is disposed radially outward of the fourth set of splines.

5. The vehicle driveline of claim 1, wherein when the sleeve is in the third position, the sleeve couples the input member to the output member and the first intermediate member for common rotation about the first axis, and wherein the sleeve is movable along the first axis to a fourth position wherein the sleeve couples the input member to the output member for common rotation about the first axis and the first intermediate member is rotatable relative to the sleeve.

6. The vehicle driveline of claim 1, further comprising a second intermediate member disposed about a third axis that is parallel to the first axis, the second intermediate member being meshingly engaged with the first intermediate member, the bevel ring gear being coupled to the second intermediate member for common rotation about the third axis.

7. The vehicle driveline of claim 1, wherein the output member includes a locking member and an output shaft, the output shaft being adapted to be coupled to the output of the differential mechanism, the output shaft defining a set of external splines, the locking member defining a set of internal splines that are meshingly engaged with the external splines.

8. The vehicle driveline of claim 1, wherein when the sleeve is in the third position, the sleeve couples the input member to the output member and the first intermediate member for common rotation about the first axis.

9. An all-wheel drive vehicle driveline comprising:
an input member disposed about a first axis, the input member being adapted to be coupled to an input of a differential mechanism for common rotation about the first axis;
a first intermediate member disposed about the first axis;
an output member disposed about the first axis, the output member being adapted to be coupled to an output of the differential mechanism for common rotation about the first axis;
a clutch member that is movable along the first axis between a first position wherein the input, output, and first intermediate members are rotatable relative to each other, a second position wherein the clutch member couples the input member to the first intermediate member for common rotation about the first axis, and a third position wherein the clutch member couples the input member to the output member and the first intermediate member for common rotation about the first axis;
a bevel ring gear drivingly coupled to the first intermediate member to receive rotary power therefrom;
a bevel pinion gear meshingly engaged to the bevel ring gear and rotatable about a second axis that is not parallel to the first axis; and
a second intermediate member disposed about a third axis that is parallel to the first axis, the second intermediate member being meshingly engaged with the first intermediate member, the bevel ring gear being coupled to the second intermediate member for common rotation about the third axis.

10. The vehicle driveline of claim 9, further comprising:
a differential mechanism including a differential case, a differential gearset, and a pair of differential outputs, the differential case being adapted to receive input torque and being coupled to the input member for common rotation about the first axis, the differential gearset being received in the differential case and configured to output differential torque to the differential outputs, one of the differential outputs being coupled to the output member for common rotation about the first axis.

11. The vehicle driveline of claim 9, wherein the input member defines a first set of splines, the first intermediate member defines a second set of splines, the output member defines a third set of splines that are located axially between the first and second sets of splines, and the clutch defines mating splines, the mating splines being configured to matingly engage the first, second and third sets of splines.

12. The vehicle driveline of claim 11, wherein the mating splines include a fourth set of splines and a fifth set of splines, the fourth set of splines being configured to matingly engage the first and third sets of splines, the fifth set of splines being configured to matingly engage the second set of splines.

13. The vehicle driveline of claim 12, wherein the fifth set of splines is disposed radially outward of the fourth set of splines.

14. The vehicle driveline of claim 9, wherein when the clutch member is in the third position, the clutch member couples the input member to the output member and the first intermediate member for common rotation about the first axis, and wherein the clutch member is movable along the first axis to a fourth position wherein the clutch member couples the input member to the output member for common rotation about the first axis and the first intermediate member is rotatable relative to the clutch member.

15. The vehicle driveline of claim 9, wherein the output member includes a locking member and an output shaft, the output shaft being adapted to be coupled to the output of the differential mechanism, the output shaft defining a set of external splines, the locking member defining a set of internal splines that are meshingly engaged with the external splines.

16. An all-wheel drive vehicle driveline comprising:
a differential mechanism including a differential case, a differential gearset, and a pair of differential outputs, the differential case being adapted to receive input torque and rotate about a first axis, the differential gearset being coupled to the differential case and configured to output differential torque to the differential outputs;
a first axle shaft and a second axle shaft, each axle shaft being coupled to a respective one of the differential outputs for common rotation about the first axis;
an input member disposed about the first axle shaft, the input member being coupled to the differential case for common rotation about the first axis;
a first intermediate member disposed about the first axle shaft;
a locking member disposed about the first axle shaft and coupled to the first axle shaft for common rotation about the first axis;
a clutch member that is movable along the first axis between a first position wherein the input member, locking member, and first intermediate member are rotatable relative to each other, a second position wherein the clutch member couples the input member to the first intermediate member for common rotation about the first axis, and a third position wherein the clutch member couples the input member to the locking member and the first intermediate member for common rotation about the first axis;
a bevel ring gear drivingly coupled to the first intermediate member; and
a bevel pinion gear meshingly engaged to the bevel ring gear and rotatable about a second axis that is not parallel to the first axis.

17. The vehicle driveline of claim 16, wherein the input member defines a first set of splines, the first intermediate member defines a second set of splines, the locking member defines a third set of splines that are located axially between the first and second sets of splines, and the clutch member defines mating splines, wherein when the clutch member is in the second position, the mating splines are configured to matingly engage the first and third sets of splines, wherein when the clutch member is in the third position, the mating splines are configured to matingly engage the first, second, and third sets of splines.

18. The vehicle driveline of claim 16, further comprising a second intermediate member disposed about a third axis that is parallel to the first axis, the second intermediate member being meshingly engaged with the first intermediate member, the bevel ring gear being coupled to the second intermediate member for common rotation about the third axis.

19. The vehicle driveline of claim 16, wherein when the clutch member is in the second position the locking member is rotatable relative to the clutch member.

20. The vehicle driveline of claim 16, wherein the differential gearset includes a first side gear, a second side gear, and a plurality of pinion gears, the first side gear being non-rotatably coupled to the first differential output, the second side gear being non-rotatably coupled to the second differential output, the pinion gears being coupled to the differential case for common rotation about the first axis and for rotation relative to the differential case, the pinion gears being meshingly engaged with the first and second side gears.

* * * * *

UNITED STATES PATENT AND TRADEMARK OFFICE
CERTIFICATE OF CORRECTION

PATENT NO. : 9,902,262 B2
APPLICATION NO. : 14/946074
DATED : February 27, 2018
INVENTOR(S) : Jeffrey L. Kincaid et al.

Page 1 of 1

It is certified that error appears in the above-identified patent and that said Letters Patent is hereby corrected as shown below:

On the Title Page

Column 1, (72) Inventors, in Line 2, delete "Clarkston" and insert --Royal Oak--, therefor.

Signed and Sealed this
Eighteenth Day of September, 2018

Andrei Iancu
*Director of the United States Patent and Trademark Office*